J. A. & B. A. JEFFERY.
APPARATUS FOR USE IN MANUFACTURING ARTICLES OF CERAMIC MATERIAL.
APPLICATION FILED JAN. 31, 1914.

1,186,203.

Patented June 6, 1916.
6 SHEETS—SHEET 1.

J. A. & B. A. JEFFERY.
APPARATUS FOR USE IN MANUFACTURING ARTICLES OF CERAMIC MATERIAL.
APPLICATION FILED JAN. 31, 1914.

1,186,203.

Patented June 6, 1916.

J. A. & B. A. JEFFERY.
APPARATUS FOR USE IN MANUFACTURING ARTICLES OF CERAMIC MATERIAL.
APPLICATION FILED JAN. 31, 1914.

1,186,203.

Patented June 6, 1916.
6 SHEETS—SHEET 5.

J. A. & B. A. JEFFERY.
APPARATUS FOR USE IN MANUFACTURING ARTICLES OF CERAMIC MATERIAL.
APPLICATION FILED JAN. 31, 1914.

1,186,203.

Patented June 6, 1916.
6 SHEETS—SHEET 6.

WITNESSES

INVENTORS
Joseph A. Jeffery
Benjamin A. Jeffery
By Hodges & Hodges
Attorneys ized by the

UNITED STATES PATENT OFFICE.

JOSEPH A. JEFFERY AND BENJAMIN A. JEFFERY, OF DETROIT, MICHIGAN.

APPARATUS FOR USE IN MANUFACTURING ARTICLES OF CERAMIC MATERIAL.

1,186,203.  Specification of Letters Patent.  Patented June 6, 1916.

Application filed January 31, 1914. Serial No. 815,692.

*To all whom it may concern:*

Be it known that we, JOSEPH A. JEFFERY and BENJAMIN A. JEFFERY, citizens of the United States, residing at Detroit, in the county of Wayne and State of Michigan, have invented new and useful Improvements in Apparatus for Use in Manufacturing Articles of Ceramic Material, of which the following is a specification.

This invention relates to improved apparatus for use in manufacturing articles of ceramic material.

Heretofore in the manufacture of porcelain articles, such as spark plugs, insulators, faucet handles, and the like, it has been the common practice to place a mass of the plastic clay upon a rapidly revolving table, the material being roughly shaped by hand to the desired form so as to provide blanks. Said blanks are allowed to stand until they reach what is known as "green" or half hard condition. This preliminary shaping is known as "throwing." The blank while in the "green" state is brought to the finished shape by being placed upon a turning lathe, the desired contour being imparted by means of suitable tools held in the hand of the operator, or otherwise positioned over the clay. After turning, the blank is allowed to dry, and then is dipped into a suitable glaze and placed in a kiln, or placed directly into the kiln, and fired. This practice results in a great percentage of loss by reason of the fact that the material has to be allowed to become "white hard" or "bone dry" after forming and before being placed in the kiln for firing. Furthermore a considerable variation in the dimensions of the finished or fired ware results from the fact that there is no accurate means of determining the exact time when the blank has reached the "green" condition, this condition depending, as it does, on the amount of water or moisture the blank may contain. Consequently, few, if any, of the blanks, contain the same percentage of water or moisture when turned or given the desired contour, and when placed aside to dry before firing, a considerable variation of the dimensions will result, and accordingly a large percentage of variation in the dimensions of the finished ware must be expected. It is obvious that skill of the highest order is required for both the throwing and the turning operations, and usually in the process of turning the piece is so shaped that the cross section of some points is much heavier and more massive than the others. In some instances cracks are formed in the drying process, and in others a settling and warping occurs, due in the first instance to the light sections drying more rapidly than the heavier; and in the second case, to the weight of the blank compressing the lighter sections unevenly.

One of the objects of the present invention is to overcome these objections by the provision of simple and improved mechanism for quickly and accurately shaping the blank.

A further object is to provide a machine capable of imparting the final shape to the blanks after the latter have reached the "white hard" condition.

A further object is to provide improved means for supporting the blanks during the shaping operation.

A further object is to provide means for quickly and accurately feeding the blank to the shaping means.

A further object is to provide means for automatically feeding the blanks to the machine and for successively acting upon said blanks to bring them to the desired shape, the functions of the machine throughout, being automatic.

The invention will be hereinafter fully set forth and particularly pointed out in the claims.

In the accompanying drawings.

Figure 1:
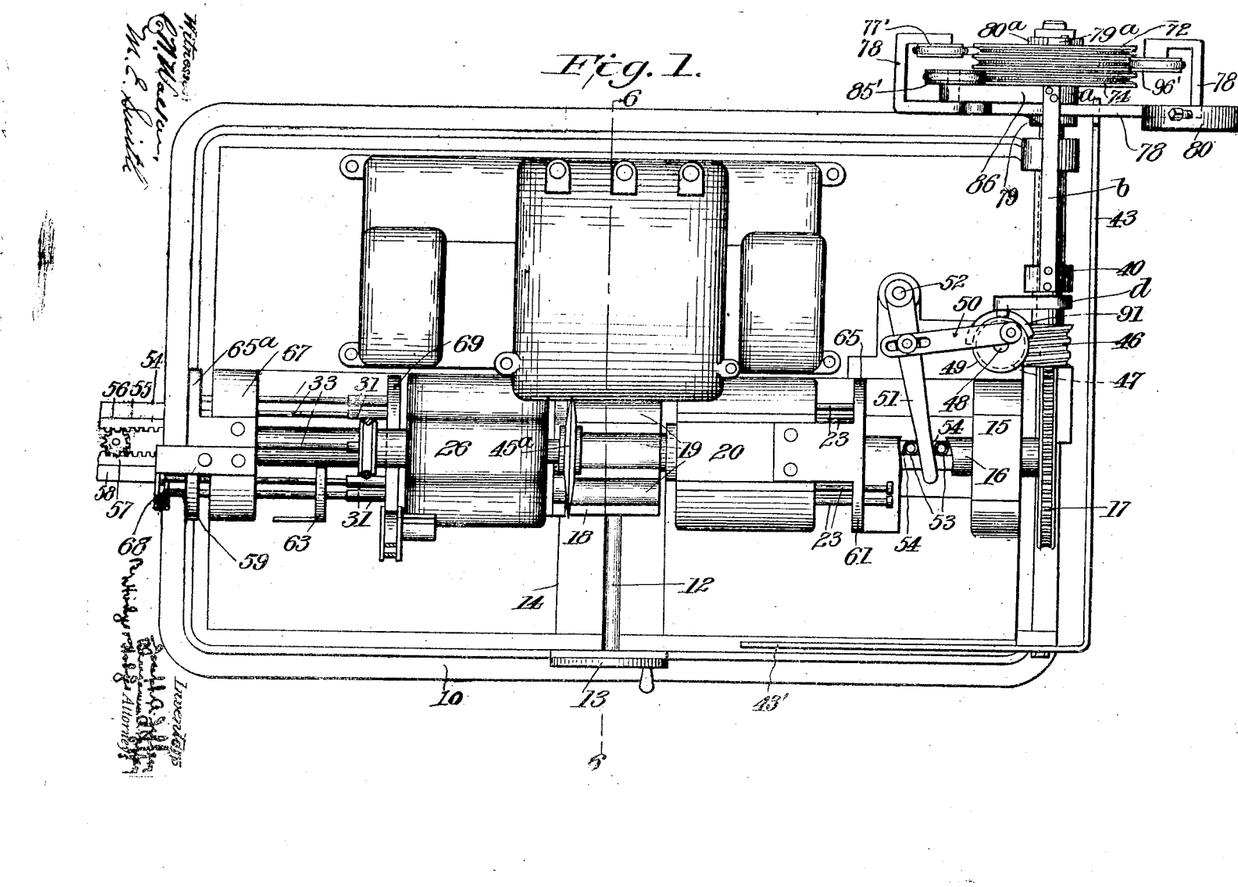
Figure 1 is a top plan view illustrating our invention.
Figure 2:
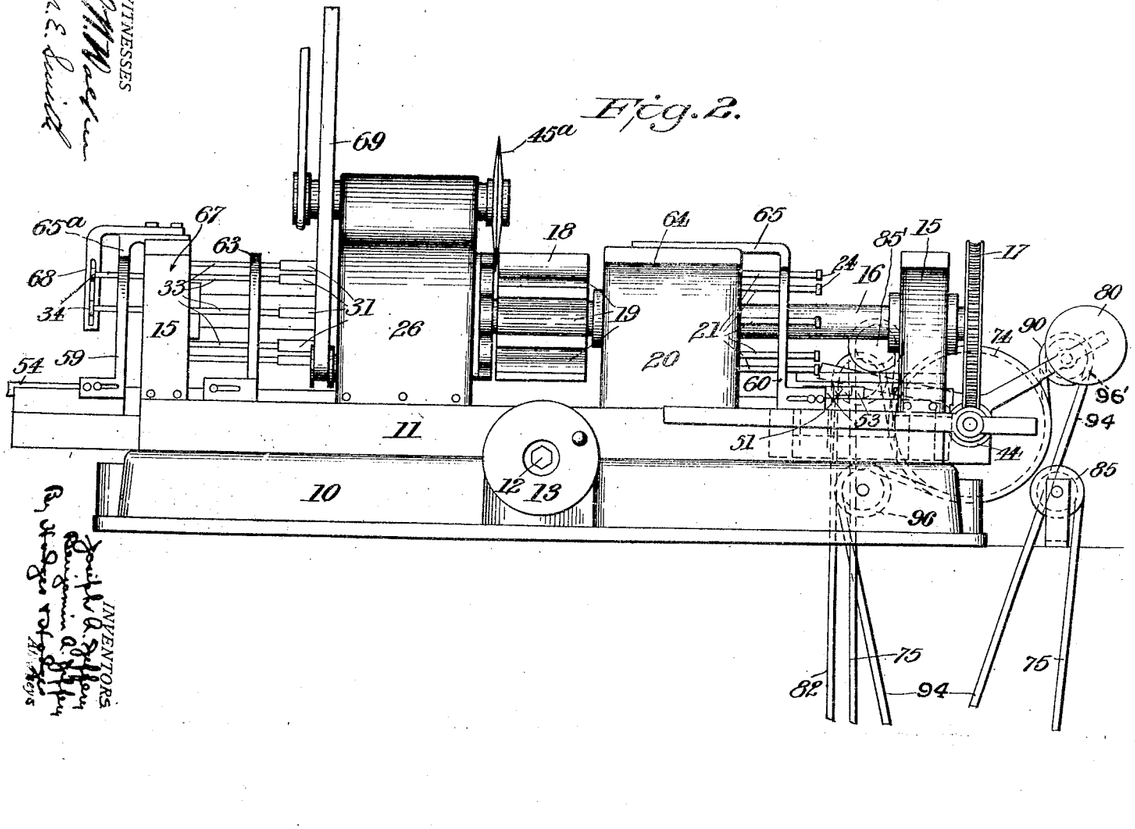
Fig. 2 is a front elevation thereof.
Figure 3:
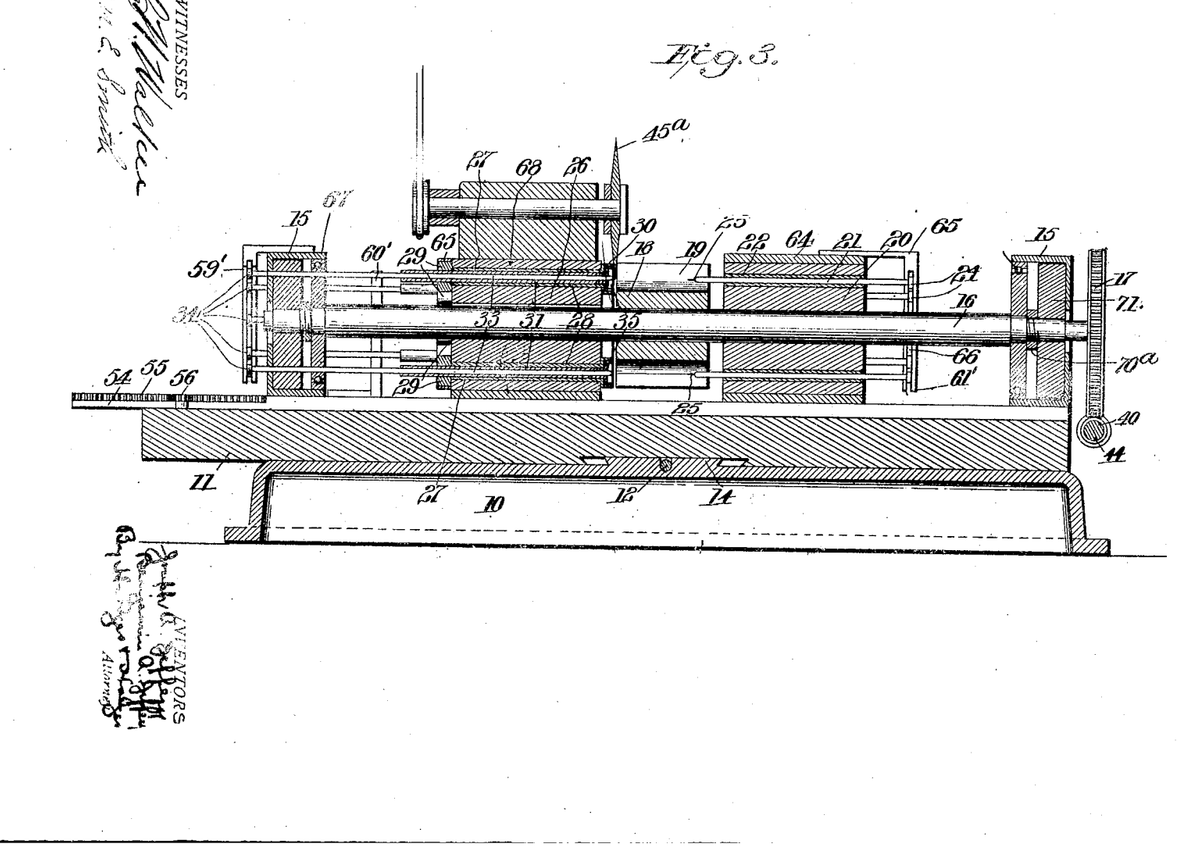
Fig. 3 is a longitudinal sectional view.
Figure 4:
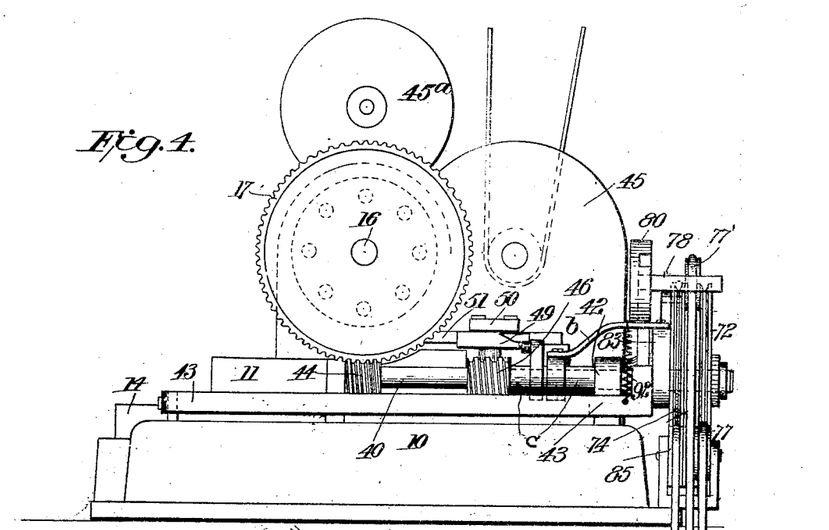
Figs. 4 and 5 are opposite end views.
Figure 5:
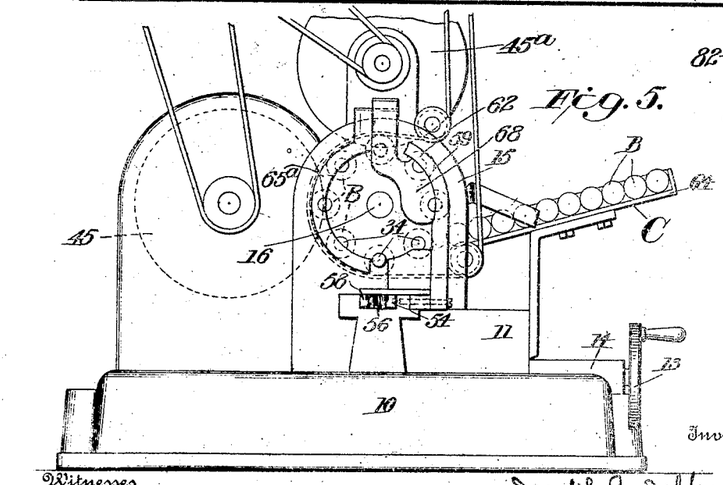
Figure 6:
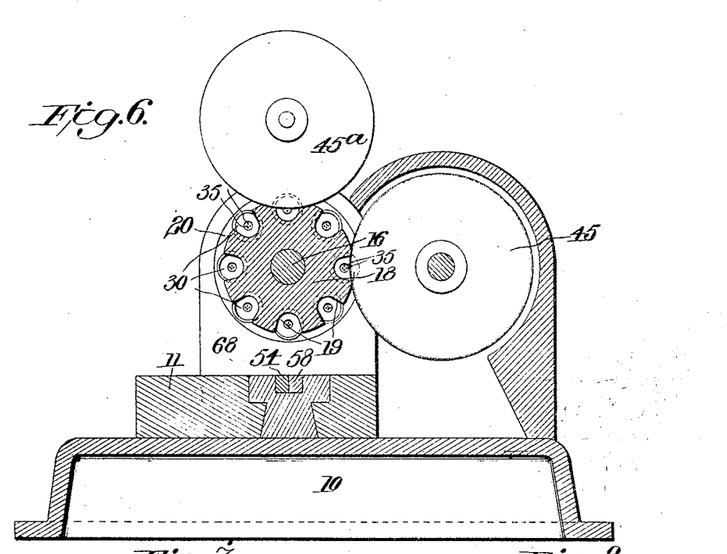
Fig. 6 is a transverse sectional view on the line 6—6, Fig. 1.
Figure 7:
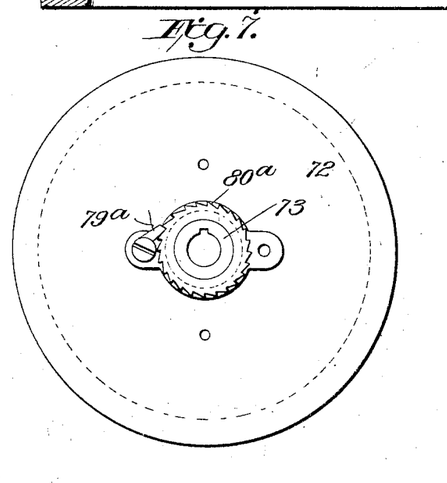
Figs. 7 and 8 are detail views of the speeding up mechanism.
Figure 8:
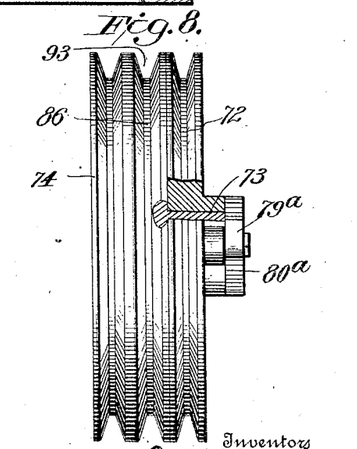
Figures 9, 10, 11, 12:
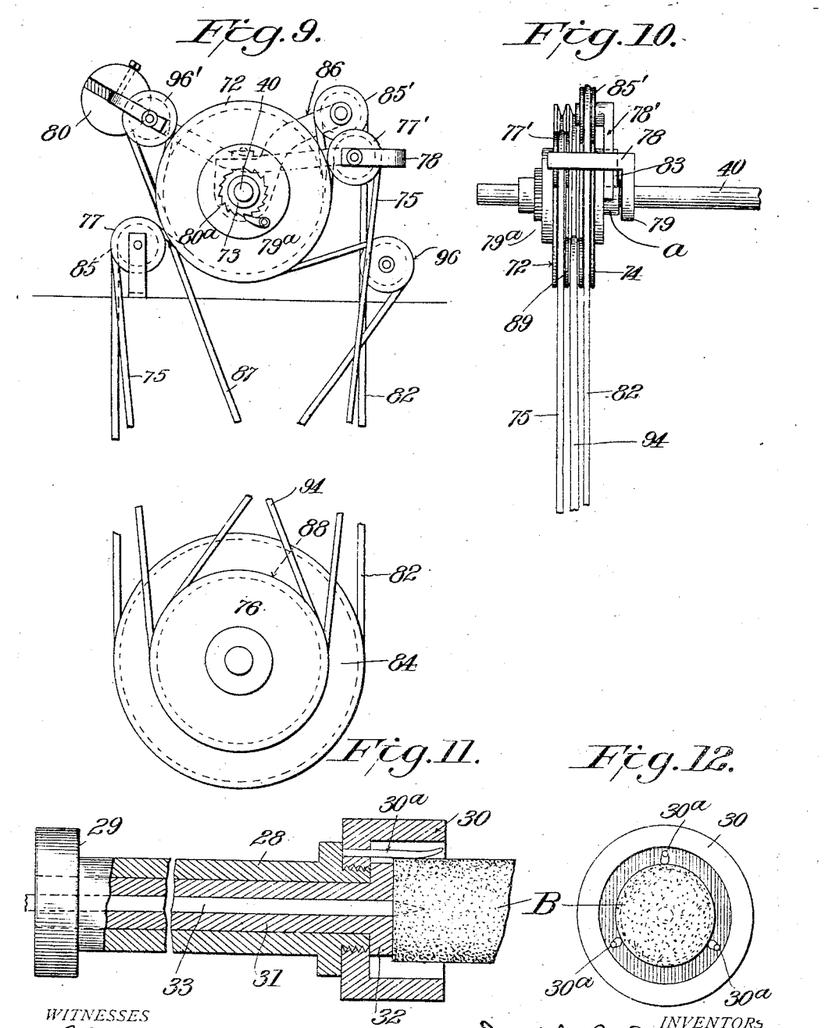
Figs. 9 and 10 are views illustrating the driving mechanism.
Figs. 11 and 12 are detail views of the blank engaging chucks.

Referring to the drawings, 10 designates a base upon which is mounted a frame 11 connected with an adjusting screw 12 operated by a hand wheel 13, by which said frame may be adjusted toward or away from the front of said base. Said frame is guided by a dovetailed rib 14. Rigidly secured to each end of the frame 11 are bearings 15 which rotatably support a main shaft 16. Said shaft may be rotated in any preferred manner, a worm wheel 17 being illustrated for that purpose and receiving power in a manner to be later described. Rigidly secured to said shaft 16 midway between said bearings is a head 18 provided with peripheral pockets 19 to receive the blanks to be shaped. Secured to the shaft 16 adjacent one end of the head 18 is a turret 20 provided with a series of spindles 21, there being one spindle 21 for each of the peripheral recesses 19. Each spindle 21 is mounted to reciprocate within a sleeve 22 carried by the turret 20, the outer end of each spindle being provided with a head 24, the inner end being pointed, as indicated at 25. Secured to the shaft 16 on the other side of head 18 is a second turret 26, provided with a plurality of chucks 30 each mounted on one end of a sleeve 28, the other end of each sleeve being provided with a pulley 29. Within each sleeve 28 is a second sleeve 31 provided with an ejector head 32 fitting within the chuck 30, the sleeve 31 being arranged to slide within the sleeve 28. Extending longitudinally through each sleeve 31 is a spindle 33 having a head 34 on its outer end, the inner end being provided with a point. The spindle 33 is mounted to reciprocate within the sleeve 31. The chucks 30 each comprise a head provided with screw threads engaging corresponding threads on the end of the sleeve 28, said head being provided with a plurality of spring fingers 30ª so shaped as to engage the blank, and to center said blank, said fingers also serving to rotate said blank when the chuck revolves.

The main drive shaft 40 is provided with a worm 44 gearing with the worm wheel 17, whereby the main shaft 16 is rotated. Mounted in suitable bearings arranged in the rear of frame 11 is a grinding wheel or drum 45, extending parallel with head 18 and rotated in any suitable manner, the face of said wheel being provided with grooves and recesses arranged to impart the desired contour to the blank. This grinding wheel may be a solid wheel made of abrasive material, or it may comprise a block of wood or any other suitable substance, formed to the desired contour and then coated with a layer of abrasive of suitable nature. In this case the abrasive would be either rolled into the surface of the block or stuck on with glue or similar material.

The main drive shaft 40 is provided with a second worm 46 meshing with a small worm wheel 47 mounted on a vertical shaft 48 which is provided with a crank disk 49. Said crank disk is connected by a link 50 with an operating arm 51, pivoted at one end 52, the free end engaging rollers or studs 53 secured to a reciprocatory member 54. Said member 54 is provided with rack teeth 55 which mesh with a pinion 56, and said pinion in turn meshes with rack teeth 57 on a second reciprocatory member 58, the arrangement being such that reciprocation of member 54 in one direction imparts a corresponding movement to member 58 in the other direction. Secured to the member 54 is an upright cam member 59, and secured to the member 58 are cam members 60 and 63. Each of said cam members is formed with an upright shank curved at its upper end, as indicated at 62. The curved portion 61 of cam member 60 conforms to the path of movement of the heads 24 of the spindles 21, as the turrets rotate, the curved portion of said cam being provided with a groove to receive said heads 24. The curved portion 62 of cam member 59 also conforms to the path of movement of the heads 34 of the spindles 33, being grooved to receive said heads. Secured to the casing 64 of the turret 20 is a guide 65 curved to conform to the path of movement of the heads 24 of the spindles 21, said guide being provided with a groove 66 to receive said spindle heads. Secured to the casing 67 of the left hand bearing 15 is a guide 65ª curved to conform to the path of movement of the heads 34 of the spindles 33, said guide having a groove to receive said spindle heads. Also secured to said casing 67 is a second guide 68 curved to conform to the curvature of the cam member 59, said guide 68 being provided with a groove to receive the heads 34 of the spindles 33.

In practice, the blanks B are fed to the machine by means of a chute C, the said blanks successively passing into the pockets or recesses 19 of the head 18. The movements of members 54 and 58 are so related that as cam member 59 moves to the right, the cam members 60 and 63 move to the left. These operations are so timed that the cam member 60 successively engages the heads of the spindles 21, moving each spindle to the left, causing the point 25 of the spindle to enter the end of the blank B, forcing the latter into the corresponding chuck 30, where it is engaged by the fingers 30ª. In this position the spindle 21 acts as a back center to retain the blank in the chuck 30 during the grinding operation. In time with the foregoing movement the cam member 59 engages the head 34 of the spindle 33 and pushes the latter to the right, causing the point of the spindle to enter the contiguous end of the blank B, whereby the formed piece is held in place after it has been severed from the remainder of the blank in a manner hereafter described. The relation of the cam member 60 and the guide 65 is such that immediately after the cam member has moved a spindle to the left, as above described, the rotation of the shaft 16 and turret 20 causes the head of the spindle to engage the groove 66, preventing withdrawal of the spindle until the forming or grinding operation has been completed. The instant each head 24 leaves the groove 66 it is engaged by the cam member 60 and moved to the right, thereby withdrawing the spindle from the blank. The guide 65ª is also so related to the cam member 59 that immediately after said cam member has moved a spindle 33 to the right, the head 34 of said spindle is engaged by the guide 65ª. The parts are so related, however, that as the head 34 of each spindle leaves the guide 65ª it is engaged by the upper end of the cam member 59 and moved to the left a sufficient distance to cause said head to engage the guide 68. In this manner the spindle is retracted to permit withdrawal of the completed blank, and held so retracted until it leaves the guide 68 at which instant it is again engaged by the cam member 59 and moved to the right, as above described.

The sleeves 28 and 31, and the spindles 33 are rotated by means of a belt 69 driven from any suitable source and engaging the pulleys 29. In this manner the chucks 30 are rotated and a corresponding rotation of the blanks takes place. As the head 18 and the turrets 20 and 26 are rotated, the blanks B are brought successively into engagement with the grinding wheel 45, and the desired contour imparted thereto in the time that the said blank is passing the said grinding wheel. Just after the grinding or shaping operation is completed the blank is engaged by the cutting disk 45ª which severs the blank close to the chuck 30. At about the same time the cam members 59 and 60 engage the heads of the spindles 33 and 21, respectively, withdrawing the pointed ends of the latter from the finished blank, in the manner heretofore described. Immediately after the blank is severed by wheel 45ª, the cam member 63 engages the end of the sleeve 31 and forces the ejector head 32 to the right, to eject the waste portion of the blank from the chuck 30, said waste portion dropping into a suitable chute or receptacle provided for that purpose. The operator may then remove the finished blank, and the foregoing operation will be continued as long as the blanks are supplied by the chute C. The ejector head 32 is returned to its normal position by the action of spindle 21 when a new blank is placed within the chuck 30.

It will be noted that the turrets 20 and 26 are mounted within suitable casings, and the bearings 15 are shown as of the floating type. That is, a suitable ball bearing 70 is provided, the shaft 16 having a collar 70ª secured thereto to prevent movement of the shaft longitudinally, a bushing 71 being also mounted on the shaft. This arrangement provides a cushion on the lubricant held between the running fits of the shaft and the bushing and the housing for the latter. We do not desire to limit ourselves, however, to the particular form of bearing referred to.

The shaft 40 is normally driven in a forward direction by a pulley 72 mounted on a bushing 73 keyed to said shaft, a second pulley 74 being secured to, or formed with said bushing. The pulley 72 is rotated by means of a belt 75 driven by pulley 76 and passing over idlers 77, 77′, the former being mounted in stationary bearings, the latter being mounted in suitable bearings carried by an arm 78. Said arm is secured to a bushing 79 pivotally mounted on the shaft 40. A weight 80 tends to normally hold the arm 78 in such a position that the idler 77′ maintains sufficient tension on the belt 75 to drive pulley 72 in a forwardly direction. It is also desirable to have the shaft 16 travel at a greater rate of speed after a blank has been completed and in order to present the next blank to the action of the grinding wheel 45, than when the blank is actually in engagement with said grinding wheel. The pulleys 72 and 74 are arranged in the manner described, to permit of change in speed. To obtain the desired results the pulley 74 is driven by a belt 82 actuated by a drive pulley 84, said belt being passed over idlers 85, 85′, the latter being supported by an arm 86 carried by a sleeve $a$ loosely mounted upon the shaft 40. Said sleeve is connected by an arm $b$ with another sleeve $c$ also loosely mounted on the shaft 40. Said sleeve $c$ is provided with an actuating arm $d$ carrying an anti-friction roller arranged to engage the under side of a cam ring 91 secured to the edge of the crank disk 49. A spring 92 connects arm $b$ with the lever 43, the action of the spring being such as to cause the arm 86 to assume a normal position which tightens the belt 82, thereby driving the pulley 74. Just before the blank B engages the shaping wheel 45 the cam 91 rocks the sleeve $c$ against the tension of the spring 92, imparting a corresponding movement to the arm 86 and the idler 85′, the movement being in a direction to relieve the tension of belt 82 whereby the driving action of said belt is neutralized. The pulley 72 is normally driven at a slower speed than the pulley 74, and when the tension on the belt 82 is reduced the wheel 74 is revolved by reason of the pawl 79ª on the wheel 72 engaging with the ratchet teeth on the wheel 74. When the arm $d$ is disengaged from the cam ring 91, said arm and the arm 86 are returned to their normal position by the spring 92, whereupon the idler 85′ is moved to tighten the belt 82. This drives the shaft at a higher rate of speed, the ratchet 80ª rotating faster than the pawl 79 which latter merely slide over the teeth until the driving action of the belt is again neutralized.

It is frequently necessary to reverse the rotation of the shaft 16 and the head 18. To accomplish this a reversing pulley is provided, the same being preferably made integral with the pulley 74, as indicated at 93. The said reversing pulley is driven by a belt 94 operated by a pulley 95 and passed over idlers 96, 96', the latter being mounted in suitable bearings carried by arm 78, the former being mounted in stationary bearings. The action of the weight 80 tends to normally hold the idler 96' in such position that the belt 94 remains loose so that the pulley 93 is inactive. The normal position of the lever 43, when the machine is in operation is such that the reversing pulley 93 is normally inactive. When it is desired to reverse the machine the front end 43' of the lever 43 is depressed, thereby relieving the tension on spring 92, moving the idler 77' to a position to render the pulley 74 inoperative and at the same time moving the idler 96' to the proper position to tighten the belt 94 and drive the reversing pulley 93. It is obvious that all the parts will cease to rotate when the lever 43 is moved to neutral position because the tension on all of the belts will be relieved.

Having thus explained the nature of our invention, and described an operative manner of constructing and using the same, although without attempting to set forth all of the forms in which it may be made, or all of the forms of its use, what we claim is:—

1. An improved apparatus for manufacturing blanks of ceramic material comprising a rotatable pattern wheel, a rotatable head mounted on an axis parallel with the axis of said pattern wheel and provided with peripheral blank receiving pockets, and means traveling with said head during its rotation for rotating the blanks.

2. An improved apparatus for manufacturing blanks of ceramic material comprising a rotatable pattern wheel, a rotatable head mounted on an axis parallel with the axis of said pattern wheel and provided with peripheral blank receiving pockets, said pattern wheel and said head being mounted in relatively fixed supports, and means traveling with said head in its rotation for supporting the blanks within said pockets.

3. An improved apparatus for manufacturing blanks of ceramic material comprising a rotatable pattern wheel, a rotatable head mounted on an axis parallel with the axis of said pattern wheel and provided with peripheral blank receiving pockets, and blank engaging chucks mounted to rotate with said head.

4. An improved apparatus for manufacturing blanks of ceramic material comprising a rotatable pattern wheel, a rotatable head mounted on an axis parallel with the axis of said pattern wheel and provided with peripheral blank receiving pockets, blank engaging chucks mounted to rotate with said head, and means for independently rotating said chucks.

5. An improved apparatus for manufacturing blanks of ceramic material comprising a rotatable pattern wheel, a rotatable head mounted on an axis parallel with the axis of said pattern wheel and provided with peripheral blank receiving pockets, chucks rotatable with said head and constructed to engage the blanks at one end, and means for moving said chucks to impart longitudinal movement to the blanks as they are carried by said head.

6. An improved apparatus for manufacturing blanks of ceramic material comprising a rotatable pattern wheel, a rotatable head mounted on an axis parallel with the axis of said pattern wheel and provided with peripheral blank receiving pockets, and blank engaging chucks rotatable with said head and each comprising a sleeve having a spindle mounted to reciprocate therewith, and means for moving the spindles into and out of engagement with the blanks as they are carried by said head.

7. An improved apparatus for manufacturing blanks of ceramic material comprising a rotatable pattern wheel, a rotatable head mounted on an axis parallel with the axis of said pattern wheel and provided with peripheral blank receiving pockets, blank engaging chucks rotatable with said head and each comprising a sleeve having a spindle mounted to reciprocate therewith, each of said spindles having a head at its outer end, and means for engaging the heads of the spindles to move the latter into and out of engagement with the blanks carried by said head.

8. An improved apparatus for manufacturing blanks of ceramic material comprising a rotatable pattern wheel, a rotatable head mounted on an axis parallel with the axis of said pattern wheel and provided with peripheral blank receiving pockets, blank engaging chucks rotatable with said head and each provided with flanges adapted to receive one end of a blank, and means for moving the blanks into engagement with said chucks.

9. An improved apparatus for manufacturing blanks of ceramic material comprising a rotatable pattern wheel, a rotatable head mounted on an axis parallel with the axis of said pattern wheel and provided with peripheral blank receiving pockets, blank engaging chucks rotatable with said head and each having means to engage one end of a blank, means for moving the blanks into engagement with the chucks, and an ejector coöperating with each chuck.

10. An improved apparatus for shaping blanks of ceramic material comprising a blank-supporting head, shaping means for acting on the blanks, chucks arranged to engage the blanks at one end, spindles disposed opposite said chucks, and means for reciprocating said spindles.

11. An improved apparatus for shaping blanks of ceramic material comprising a blank-supporting head, shaping means for acting on the blanks, a series of spindles arranged to engage the blanks at one end, chucks concentric with said spindles and arranged to engage the blanks at the other end, a second series of spindles arranged opposite the first mentioned spindles, and means for reciprocating said spindles.

12. An improved apparatus for shaping blanks of ceramic material comprising a blank-supporting head, shaping means for acting on the blanks, a series of spindles for engaging the blanks at one end, chucks concentric with said spindles, and arranged to engage the blanks at the other end, ejectors coöperating with said chucks, a second series of spindles opposite the first mentioned spindles, and means for reciprocating said spindles and ejectors.

13. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, and means for moving the blanks into engagement with said chucks.

14. An improved apparatus for shaping blanks of ceramic material comprising a blank-supporting head, shaping means for acting on the blanks, a rotatable turret, sleeves rotatably mounted in said turret and provided with chucks arranged to engage the blanks at one end, means for independently rotating said sleeves, and means for moving the blanks into engagement with the chucks.

15. An improved apparatus for shaping blanks of ceramic material comprising a blank supporting head, shaping means for acting on the blanks, a rotatable turret, chucks carried by said turret and arranged to engage the blanks at one end, means for independently rotating said chucks, means for moving the blanks into engagement with said chucks, and ejectors coöperating with said chucks.

16. An improved apparatus for shaping blanks of ceramic material comprising a blank-supporting head, shaping means for acting on the blanks, a rotatable turret, sleeves rotatably mounted in said turret and provided with chucks arranged to engage the blanks at one end, means for independently rotating said sleeves, means for moving the blanks into engagement with the chucks, sleeves mounted to reciprocate within the first mentioned sleeves and provided with ejector heads, and means for reciprocating the last mentioned sleeves.

17. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, means for moving the blanks into engagement with said chucks, blank-engaging spindles centrally supported within said chucks, and means for reciprocating said spindles.

18. An improved apparatus for shaping blanks of ceramic material comprising a blank-supporting head, shaping means for acting on the blanks, a rotatable turret, sleeves rotatably mounted in said turret and provided with chucks arranged to engage the blanks at one end, means for independently rotating said sleeves, means for moving the blanks into engagement with the chucks, blank-engaging spindles supported within said sleeves, and normally projecting beyond said chucks, and means for reciprocating said spindles.

19. An improved apparatus for shaping blanks of ceramic material comprising a blank-supporting head, shaping means for acting on the blanks, a rotatable turret, sleeves rotatably mounted in said turret and provided with chucks arranged to engage the blanks at one end, means for independently rotating said sleeves, means for moving the blanks into engagement with the chucks, sleeves mounted to reciprocate within the first mentioned sleeves, and provided with ejector heads, means for reciprocating the last mentioned sleeves, blank-engaging spindles mounted to reciprocate within the last mentioned sleeves, and means for reciprocating said spindles.

20. An improved apparatus for shaping blanks of ceramic material comprising a blank-supporting head, shaping means for acting on the blanks, a rotatable turret, sleeves rotatably mounted in said turret and provided with chucks arranged to engage the blanks at one end, means for independently rotating said sleeves, spindles disposed opposite to said chucks, and means for reciprocating said spindles.

21. An improved apparatus for shaping blanks of ceramic material comprising a blank-supporting head, shaping means for acting on the blanks, a rotatable turret, sleeves rotatably mounted in said turret and provided with chucks arranged to engage the blanks at one end, means for independently rotating said sleeves, spindles disposed opposite to said chucks, means for reciprocating said spindles, sleeves mounted to reciprocate within the first mentioned sleeves and provided with ejector heads, and means for reciprocating said ejector sleeves.

22. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, means for moving the blanks into engagement with said chucks, said means including spindles disposed opposite said chucks, and spindles supported by said chucks.

23. An improved apparatus for shaping blanks of ceramic material comprising a blank-supporting head, shaping means for acting on the blanks, chucks arranged to engage the blank at one end, spindles disposed opposite said chucks, a stationary guide for said spindles, and means for moving said spindles into and out of engagement with said guide.

24. An improved apparatus for shaping blanks of ceramic material comprising a blank-supporting head, shaping means for acting on the blanks, chucks arranged to engage the blanks at one end, spindles disposed opposite said chucks, a stationary guide for said spindles, a cam for moving said spindles into and out of engagement with said guide, and means for actuating said cam.

25. An improved apparatus for shaping blanks of ceramic material comprising a blank-supporting head, shaping means for acting on the blanks, chucks arranged to engage the blanks at one end, spindles disposed opposite said chucks, spaced apart stationary guides for said spindles, and means for moving said spindles into and out of engagement with said guides.

26. An improved apparatus for shaping blanks of ceramic material comprising a blank-supporting head, shaping means for acting on the blanks, chucks arranged to engage the blanks at one end, spindles disposed opposite said chucks, a stationary guide for said spindles, a cam for moving said spindles into and out of engagement with said guide, and a reciprocating member to which said cam is secured.

27. An improved apparatus for shaping blanks of ceramic material comprising a blank-supporting head, shaping means for acting on the blanks, chucks arranged to engage the blanks at one end, spindles disposed opposite said chucks, spindles carried by said chucks, stationary guides for the respective spindles, and means for simultaneously moving the spindles of each set into and out of engagement with the respective guides.

28. An improved apparatus for shaping blanks of ceramic material comprising a blank-supporting head, shaping means for acting on the blanks, chucks arranged to engage the blanks at one end, spindles carried by said chucks, spindles disposed opposite the first mentioned spindles, stationary guides for the respective spindles, cams for moving the spindles into and out of engagement with the respective guides, and means for operating said cams in time with each other.

29. An improved apparatus for shaping blanks of ceramic material comprising a blank-supporting head, shaping means for acting on the blanks, chucks arranged to engage the blanks at one end, spindles carried by said chucks, spindles disposed opposite the first mentioned spindles, stationary guides for the respective spindles, cams for moving the spindles into and out of engagement with the respective guides, and reciprocating members to which said cams are secured.

30. An improvement in apparatus for shaping blanks of ceramic material comprising a blank-supporting head, shaping means for acting on the blanks, chucks arranged to engage the blanks at one end, spindles carried by said chucks, spindles disposed opposite the first mentioned spindles, stationary guides for the respective spindles, cams for moving the spindles into and out of engagement with the respective guides, reciprocating members to which said cams are secured, an actuating arm for one of said reciprocating members, and means actuated by the last mentioned reciprocating member for imparting movement to the other reciprocating member.

31. An improved apparatus for shaping blanks of ceramic material comprising a blank-supporting head, a pattern wheel for acting on the blanks, blank-engaging chucks, spindles disposed opposite to said chucks, and reciprocating cam members for moving said spindles into and out of engagement with the blanks while the latter are supported by said head.

32. An improved apparatus for shaping blanks of ceramic material comprising a blank supporting head, a pattern wheel for acting on the blanks, oppositely disposed blank engaging spindles, reciprocating members, cam members carried by said reciprocating members and arranged to engage said spindles, an actuating arm for operating one of said reciprocating members, and means actuated by the last mentioned reciprocating member for actuating the other reciprocating member.

33. An improved apparatus for shaping blanks of ceramic material comprising a blank-supporting head, a pattern wheel for acting on the blanks, oppositely disposed blank-engaging spindles, reciprocating members provided with cams for acting on said spindles, a crank disk, an actuating arm for said reciprocating members connected with said crank disk, and means for actuating said crank disk.

34. An improved apparatus for shaping blanks of ceramic material comprising a blank supporting head, a pattern wheel for acting on the blanks, turrets located at opposite ends of said head, blank engaging spindles mounted in said turrets, and means for successively operating the spindles of both turrets in time with each other.

35. An improved apparatus for shaping blanks of ceramic material comprising a blank-supporting head, a pattern wheel for acting on the blanks, turrets located at opposite ends of said head, blank-engaging spindles mounted in said turrets, reciprocating members provided with means for actuating said spindles, and means for operating said reciprocating members.

36. An improved apparatus for shaping blanks of ceramic material comprising a blank supporting head, a pattern wheel for acting on the blanks, turrets located at opposite ends of said head, blank-engaging spindles mounted in said turrets, cams for actuating said spindles, and means for operating the cams.

37. An improved apparatus for shaping blanks of ceramic material comprising a blank-supporting head, a pattern wheel for acting on the blanks, turrets located at opposite ends of said head, blank-engaging spindles mounted in said turrets, upright cam members arranged to engage said spindles, reciprocating members to which said cam members are secured, and means for actuating said reciprocating members.

38. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, ejectors coöperating with said chucks, and means for reciprocating said ejectors.

39. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, ejectors coöperating with said chucks, spindles extending through said chucks, and means for independently reciprocating said spindles and said ejectors.

40. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, ejectors coöperating with said chucks, cam members for reciprocating said ejectors and said spindles, and means for operating said cam members in time with each other.

41. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, ejectors coöperating with said chucks, spindles extending through said chucks, a second series of spindles disposed opposite the first mentioned spindles, and means for reciprocating said spindles and ejectors in time with each other.

42. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, ejectors coöperating with said chucks, spindles extending through said chucks, a second series of spindles disposed opposite the first mentioned spindles, cam members for reciprocating said spindles and said ejectors, and means for operating the cam members in time with each other.

43. An improved apparatus for shaping blanks of ceramic material comprising a blank-supporting head, shaping means for acting on the blanks, a rotatable turret, chucks carried by said turret and arranged to engage the blanks at one end, means for independently rotating said chucks, ejectors coöperating with said chucks, spindles extending through said chucks, a second series of spindles disposed opposite the first mentioned spindles, cam members for reciprocating said ejectors and said spindles, reciprocating members supporting said cam members, and means for actuating said reciprocating members.

44. An improved apparatus for shaping blanks of ceramic material comprising a rotatable blank-supporting head, a pattern wheel for acting on the blanks, means for rotating said head, and means for intermittently varying the speed of rotation of said head.

45. An improved apparatus for shaping blanks of ceramic material comprising a rotatable blank-supporting head, a pattern wheel for acting on the blanks, a drive shaft geared to rotate said head, a drive pulley fast to said shaft, a second drive pulley loosely supported on said shaft, and means for intermittently clutching said drive pulleys together.

46. An improved apparatus for shaping blanks of ceramic material comprising a rotatable blank-supporting head, a pattern wheel for acting on the blanks, a drive shaft geared to rotate said head, fast and loose drive pulleys mounted on said shaft, a ratchet wheel carried by one of said pulleys, and a pawl carried by the other pulley and engaging said ratchet wheel.

47. An improved apparatus for shaping blanks of ceramic material comprising a rotatable blank-supporting head, a pattern wheel for acting on the blanks, a drive shaft geared to rotate said head, fast and loose drive pulleys carried by said shaft, means for driving said pulleys at different rates of speed, means for periodically disconnecting the fast pulley from its driving means, and means for automatically clutching said pulleys together.

48. An improved apparatus for shaping blanks of ceramic material comprising a rotatable blank-supporting head, a pattern wheel for acting on the blanks, a drive shaft geared to rotate said head, fast and loose drive pulleys carried by said shaft, means for driving said pulleys at different rates of speed, means for periodically disconnecting the fast pulley from its driving means, and a pawl and ratchet connection between said pulleys.

49. An improved apparatus for shaping blanks of ceramic material comprising a rotatable blank-supporting head, a pattern wheel for acting on the blanks, a drive shaft geared to rotate said head, fast and loose drive pulleys carried by said shaft, means for driving said pulleys at different rates of speed, means for periodically disconnecting the fast pulley from its driving means, means for automatically clutching said pulleys together, and means for reversing said shaft.

In testimony whereof we have hereunto set our hands in presence of two subscribing witnesses.

JOSEPH A. JEFFERY.
BENJAMIN A. JEFFERY.

Witnesses:
M. C. DEWITT,
ALBERT G. BETTELEY.